W. B. BIZZELL.
Saw-Filing Machines.
No. 140,399. Patented July 1, 1873.
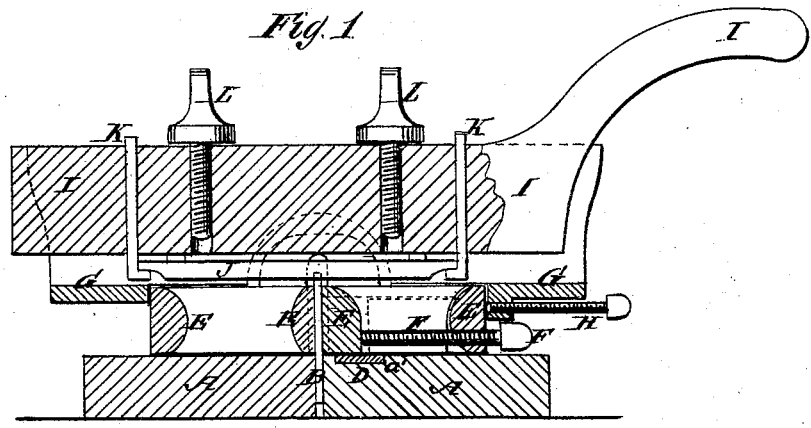
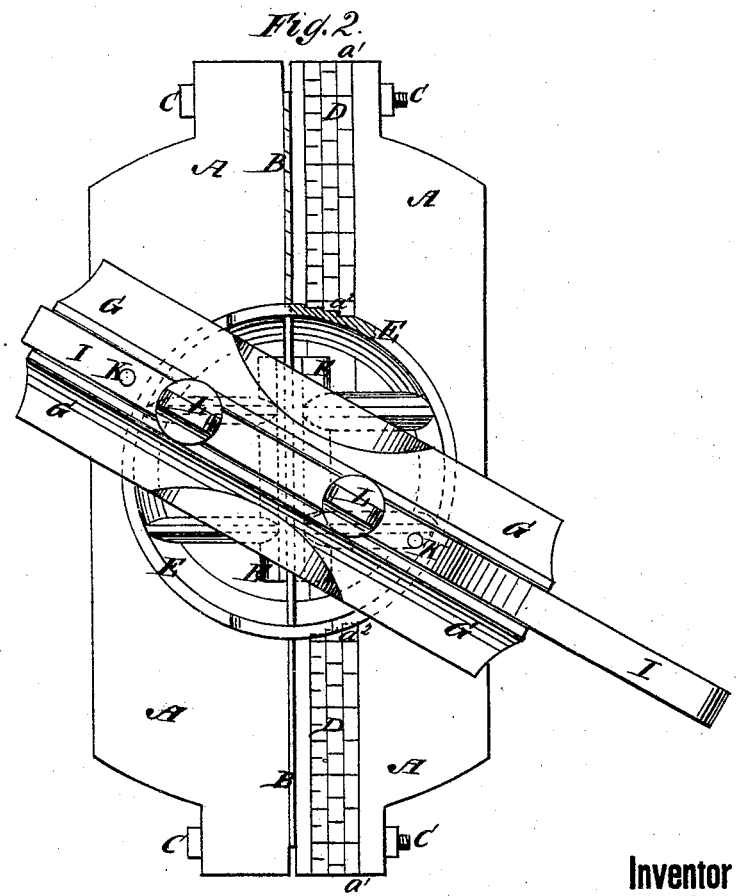
Witnesses:
E. Wolff
Inventor:
W. B. Bizzell
Per
Attorneys.

UNITED STATES PATENT OFFICE.

WILLIAM B. BIZZELL, OF LA GRANGE, NORTH CAROLINA, ASSIGNOR TO HIMSELF AND W. H. HARDEE, OF SAME PLACE.

IMPROVEMENT IN SAW-FILING MACHINES.

Specification forming part of Letters Patent No. 140,399, dated July 1, 1873; application filed April 26, 1873.

*To all whom it may concern:*

Be it known that I, WILLIAM B. BIZZELL, of La Grange, in the county of Lenoir and State of North Carolina, have invented a new and useful Improvement in Hand-Saw Filing-Machine, of which the following is a specification:

Figure 1 is a detail section of my improved machine. Fig. 2 is a top view of the same.

My invention has for its object to furnish an improved machine for use in filing saws, which shall be simple in construction and convenient in use, and will enable the saw to be filed quickly and accurately, and will render the operation of "striking" unnecessary. The invention consists in the clamps, the rule, the clamps and their set-screw, the guide-frame and its set-screw, and the file-handle and its adjustable screws, in combination with each other, as hereinafter fully described.

A are clamps for holding the saw B to be filed, and which are secured to said saw B by bolts C passing through their ends. The clamps A may be made of hard wood. In one of the clamps A is formed a groove, $a'$, to receive a rule, D, upon each side of which are formed three scales of division-marks, thus forming six scales, corresponding with the distance apart of the points of the teeth of the six numbers of saws more frequently used, viz., Nos. 5, 6, 7, 8, 9, 10. E are the clamps for connecting the machine with the saw. The stationary jaw of the clamps E is stationary and rigidly connected with a circular frame by arms. The other jaw is movable, and slides back and forth upon arms formed upon the said circular frame, as it is moved by a screw, F, passing through the circular frame. The circular frame of the clamps E is notched to receive the toothed edge of the saw, and rests upon the clamps A, as shown in Figs. 1 and 2. In the outer surface of the circular frame are formed three notches, $e'$, to correspond with the three scales of division-marks of the rule D. G is the guide-frame for the saw-handle, in the lower part of which is formed a circular recess to fit upon the circular frame of clamp E, to which it is secured when adjusted by a set-screw, H. The lower parts of the sides of the guide-frame G have wide semicircular notches formed in them to receive the toothed edge of the saw B. The upper side of the guide-frame G has a longitudinal groove formed in it to receive the file-handle I. To the lower edge of the straight part of the handle I is secured the file J by clamping-bolts K, or other convenient fastenings. To the upper edge of the straight part of handle I are secured two adjustable screws, L, the heads of which are made sufficiently wide to rest upon the edges of the guide-frame $G_2$, so that by adjusting the said screws L the machine may be adjusted to file the saw-teeth to any desired depth.

In using the machine the saw B is secured in the clamps A, with its toothed edge projecting about one and a quarter inch above the said clamps A. The clamps E are then placed upon the saw B and clamp A. The guide-frame G is placed upon the clamps E, and the file-handle I is placed in the groove of the guide-frame G. The guide-frame G is adjusted to bring the saw to the desired angle across the saw, and is secured in place by the set-screw H. The clamps E are adjusted to bring the file to the first tooth, and the screw F is tightened. The screws L are adjusted to file the teeth to the desired depth. The rule D is adjusted to bring the appropriate notch in the circular frame of the clamps E to a division-mark of the proper scale. After filing one side of the teeth, the machine is again adjusted and the other side of the teeth is filed.

Having thus described my invention, I claim as new and desire to secure by Letters Patent—

The clamp A, rule D, clamps E, set-screw F, guide-frame G, set-screw H, file-handle J, and adjustable screws L, in combination with each other, substantially as herein shown and described, and for the purpose set forth.

WM. B. BIZZELL.

Witnesses:
W. T. BEST,
JOHN S. BIZZELL.